INVENTOR
JAN VAN DER HEEM
BY John H Graham
HIS AGENT.

Patented Mar. 14, 1950

2,500,720

UNITED STATES PATENT OFFICE 2,500,720

PIPE CONNECTION

Jan van der Heem, Voorburg, Netherlands, assignor, by mesne assignments, to Jan van der Heem, Voorburg, Netherlands, and Van der Heem N. V., The Hague, Netherlands, a corporation of the Netherlands Application March 4, 1948, Serial No. 12,921
In the Netherlands March 12, 1947

2 Claims. (Cl. 285—161)

The invention relates to a pipe connection, especially for suction pipes of suction cleaners.

For interconnecting parts of suction cleaner pipes or of a pipe to a suction nozzle or other auxiliary part but also for the mutual coupling of other kinds of pipes hitherto a slight conicity is given to the ends which fit in each other.

In order to achieve the connection a pressure is exerted in the lengthwise direction of the pipes. The parts more or less will stick fast tightly. In so doing the fact arises that the suction pipe (resp. the lowest part of same) in the long run will stick so firmly in the suction nozzle owing to the pressure which is continuously exerted on same during the suction, that the parts can not be loosened or only with very much trouble. This especially occurs when sand or dust enters between the parts. On the other hand it is noticed at the upper end of the suction pipe (resp. the upper part of same) that owing to the lateral forces exerted by the connecting member of the hose this connecting member gets so loose that it cannot be rigidly connected in the suction pipe, but jerks loose. By the way it is observed that mathematically equal cones can practically not be made.

The invention aims at removing these objections and provides a means by which especially with pipe constructions of light and readily deformable metal a good connection can be obtained which, however, can always easily and efficiently be brought about and decoupled.

To this end the part adjacent the end of one of the two interconnecting pipes is so deformed that the pipes do not contact another over the entire circumference, but only along a few generating lines.

The invention is based on the fact that a not permanent but only elastic deformation of the wall of the other pipe is caused.

The clamping action with the old construction occurred over the entire circumference of the pipes and mainly at the conical ends.

With the new construction the end is made more conical; this part only serves for enabling to insert the one pipe more easily into the other one and furthermore for the seal. The following part only fits in a few, e. g. three places with a few generating lines in the other, not deformed pipe. The principle of the invention of course also applies for unround pipes.

The invention will now be described with reference to the accompanying drawing which shows an embodiment of the invention and in which.

The two suction cleaner pipes 1 and 2 to be connected together are so shaped that they do not contact over the entire circumferential area but only along generating lines or parts 3 of the circumference. This is accomplished by providing the parts of the tubes 1 and 2, which contact each other with flattened parts 4. These parts 4 for the sake of clarity are shown greatly exaggerated and actually may be much smaller.

Evidently the invention is not restricted to an embodiment with three parts 4, and a pipe with more than three flattened parts (see Fig. 4) falls within the scope of the invention.

In order to easily connect the pipes 1 and 2 the inner pipe is preferably provided with a conical part.

Figure 1:
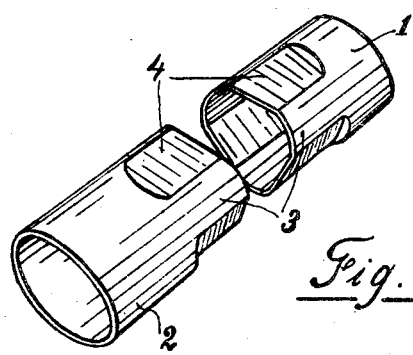
Figure 1 is a view in perspective of a pipe connection according to the invention in which the flattened parts are exaggerated a great deal for the sake of clarity.
Figure 2:
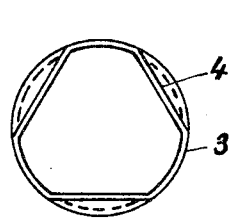
Figure 2 is an axial view of a pipe as shown in Fig. 1.
Figure 3:
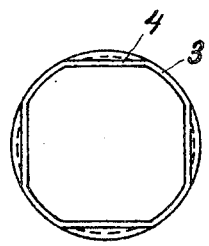
Figure 3 is a view of another form of pipe according to the invention.
Figure 4:
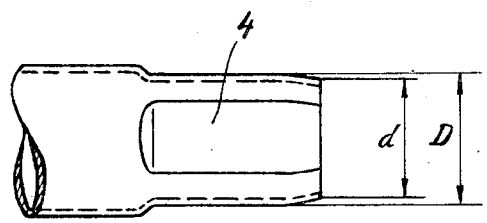
Figure 4 is a view which illustrates that the pipe has a conical portion.

The conical end is indicated in Fig. 4 by the letters $d$ and $D$. The cone may be very large at this part without influencing the mutual co-operation of the tubes 1 and 2.

As it were flattened parts arise in the lengthwise direction of the pipe. When inserting the pipe the friction is less and the there arising elastic deformations take care of an efficient connection which is sufficient but can always easily be released.

According to the invention in general the pre-deformation will be given to the inner pipe; however, it is also possible to apply the principle to the external pipe. The mutual co-operation is then maintained.

I claim:

1. A detachable pipe connection comprising male and female coacting end portions, longitudinally extending peripheral deformations on at least one of said end portions relative to the corresponding peripheral form of the other coacting portion, whereby said portions contact and wedge-fit on the lines of said deformations only.

2. In a suction cleaner, a detachable pipe connection comprising a female connecting end portion, a shoulder forming an internal seat in said end portion, a coacting male member ending in a cone-shaped portion adapted to rest in said seat, longitudinally extending peripheral deformations on at least one of said members, whereby said members contact and wedge-fit along the lines of said deformations only.

JAN VAN DER HEEM.

REFERENCES CITED

The following references are of record in the file of this patent:

UNITED STATES PATENTS

| Number | Name | Date |
|---|---|---|
| 1,229,079 | Hill | June 5, 1917 |
| 1,527,383 | Solliday | Feb. 24, 1925 |
| 1,743,431 | Congable | Jan. 14, 1930 |
| 1,974,124 | Riebel et al. | Sept. 18, 1934 |